US008211951B2

(12) United States Patent
Lloyd et al.

(10) Patent No.: US 8,211,951 B2
(45) Date of Patent: Jul. 3, 2012

(54) HIGH SELECTIVITY POLYMER-NANO-POROUS PARTICLE MEMBRANE STRUCTURES

(75) Inventors: Douglas R. Lloyd, Austin, TX (US); Caleb V. Funk, Wayzata, MN (US)

(73) Assignee: Board of Regents, The University of Texas System, Austin, TX (US)

( * ) Notice: Subject to any disclaimer, the term of this patent is extended or adjusted under 35 U.S.C. 154(b) by 29 days.

(21) Appl. No.: 12/558,650

(22) Filed: Sep. 14, 2009

(65) Prior Publication Data

US 2010/0093879 A1 Apr. 15, 2010

Related U.S. Application Data

(63) Continuation of application No. PCT/US2008/056630, filed on Mar. 12, 2008.

(60) Provisional application No. 60/894,234, filed on Mar. 12, 2007.

(51) Int. Cl.
 C08J 5/22 (2006.01)
 B32B 3/26 (2006.01)
(52) U.S. Cl. ...................................... 521/27; 428/304.4

(58) Field of Classification Search .................... 521/27; 428/304.4
See application file for complete search history.

(56) References Cited

U.S. PATENT DOCUMENTS

| 2003/0219587 A1* | 11/2003 | Pekala | 428/304.4 |
| 2006/0120213 A1* | 6/2006 | Tonkovich et al. | 366/144 |
| 2006/0201884 A1* | 9/2006 | Kulprathipanja et al. | 210/651 |

FOREIGN PATENT DOCUMENTS

WO    WO 03100954 A2 * 12/2003

OTHER PUBLICATIONS

International Preliminary Report on Patentability for PCT/US08/056630, dated Sep. 24, 2009.

* cited by examiner

Primary Examiner — Michael M Bernshteyn
(74) Attorney, Agent, or Firm — Baker Botts L.L.P.

(57) ABSTRACT

Methods comprising mixing at least one nano-porous particle into a homogeneous solution of a polymer and a diluent at an elevated temperature to form a mixture; and cooling the mixture to solidify the polymer. Membranes comprising at least one nano-porous particle; and a polymer; wherein the at least one nano-porous particle comprises pores ranging from about 0.1 nanometers to about 10,000 nanometers in size.

3 Claims, 12 Drawing Sheets

Sieve Loading = 35%

HIGH SELECTIVITY POLYMER-NANO-POROUS PARTICLE MEMBRANE STRUCTURES

CROSS-REFERENCE TO RELATION APPLICATIONS

This application is a continuation of International Application No. PCT/US08/56630 filed Mar. 12, 2008, which claims the benefit of U.S. Provisional Application Ser. No. 60/894,234, filed Mar. 12, 2007, both of which are incorporated herein by reference.

STATEMENT OF GOVERNMENT INTEREST

This disclosure was made with support under Grant Number 26681332, awarded by National Water Research Institute. The U.S. government has certain rights in the invention.

BACKGROUND

For many years it has been desired to produce membranes that can separate chemical species of similar size efficiently. Typical applications include gas separations (such as $O_2/N_2$ and $CH_4/CO_2$), the removal of organics and salts from water by reverse osmosis, and the separation of ethanol and water by pervaporation.

Polymeric membranes made by conventional processes such as interfacial polymerization, phase inversion, and evaporative casting have long been used for separation applications; however, researchers and manufacturers have not been able to obtain sufficiently narrow pore-size distributions to achieve the efficient separation of chemical species of almost identical size. This is partially due to the pore size distribution found in polymeric membranes as a result of polymer chain packing. Because polymers are not 100% crystalline, entropic effects cause some interchain voids to be larger than others. Furthermore, the general inability of a polymer membrane to restrict rotational degrees of freedom of larger molecules while allowing unrestricted movement of smaller molecules makes it difficult to prevent the diffusion of larger molecules across the membrane. These phenomena result in a flux/selectivity tradeoff that limits the effectiveness of polymeric membranes.

Attempts have been made to achieve more refined size-based separations by using structured inorganic materials, such as zeolites, in the form of flat sheet membranes. These membranes show great potential due to their narrow pore size distributions. However, due to their fragile nature and difficult formation procedures, they have not yet been widely used. Furthermore, since these membranes cannot be made in hollow fiber form (which results in a high surface area to volume ratio), their surface area to volume ratio also limits their use. In applications that require superior chemical and thermal stability, ceramic membranes have proven to be better than polymer membranes. However, these membranes are often expensive, difficult to produce, and fragile.

Over the past decade, mixed matrix membranes have been proposed as an answer to the above membrane drawbacks. By suspending zeolite particles in a continuous matrix of low permeability polymer matrix, it has been possible to achieve separations not possible by polymer membranes. The improvement is gained from suspended zeolite particles locked into the polymer matrix. These particles are chosen to substantially decrease the permeability of one chemical component while increasing the permeability of another. Thus, the desired permeate component moves faster through a mixed matrix membrane than through a purely polymeric membrane made with the same polymer. Additionally, the undesired chemical component is forced to travel a more tortuous path around the zeolite particles, thus decreasing mobility for that component and increasing the overall selectivity for the desired component. Like zeolite films, however, mixed matrix membranes are not without drawbacks. For example, such mixed matrix membranes are limited in their separation capabilities. Because the zeolite particles are by no means a continuous separation layer, only a small improvement over polymeric membranes may be achieved. Furthermore, many researchers have dealt with poor polymer-zeolite adhesion, which results in decreased selectivity.

Numerous membranes have been used to varying degrees of success for separations; however, more refined size separations remain the goal of considerable ongoing research. Therefore, the remaining challenge is to produce a membrane with the effectiveness of a continuous zeolite sheet, but with the flexibility and durability of a mixed matrix membrane.

SUMMARY

The present invention concerns microporous mixed matrix membranes for separation. More particularly, it concerns high selectivity polymer-nano-porous particle membrane structures formed via thermally induced phase separation, or TIPS membranes, that are useful for both water purification (removal of salts and dissolved organics) and gas separation. The microporous mixed matrix membranes also may be used in a variety of reverse osmosis, pervaporation, and nanofiltration applications where trace contaminants need to be removed from a chemical stream.

The membranes of the present invention have several advantages over conventional membranes. The TIPS membranes maintain significant advantages of conventional polymeric membranes, zeolite films, and mixed matrix membranes, while eliminating many disadvantages. First, these membranes are able to accomplish difficult gas separations and difficult water purification steps with high selectivity. Furthermore, TIPS membranes, unlike zeolite membranes, may be made easily into hollow fibers and form high surface area structures. In contrast, many conventional membranes may only be made into flat sheets, which have low surface area to volume ratios compared to hollow fibers. The hollow fibers may be packed tightly into a membranes module for larger surface areas in a smaller space, and these modules can give much higher fluxes over conventional membranes. Further, zeolites with different pore sizes may be used to specifically fabricate TIPS membranes for a particular application by varying the type of zeolite selected. Additionally, these membranes overcome the issues of fragility and costs associated with conventional membranes.

Generally, membranes of the present invention comprise nano-porous particles, a polymer, and pores ranging from about 0.1 nm to about 10,000 nm. Generally, the membranes of the present invention are fabricated by providing nano-porous particles, providing a homogeneous solution of a polymer and a diluent, mixing the nano-porous particles into the homogeneous solution of a polymer and a diluent at an elevated temperature to form a mixture, cooling the mixture to solidify a microporous polymer matrix, and optionally removing the diluent.

The features and advantages of the present invention will be readily apparent to those skilled in the art upon a reading of the description of the embodiments that follows.

DRAWINGS

Some specific example embodiments of the disclosure may be understood by referring, in part, to the following description and the accompanying drawings.

Figure 8:
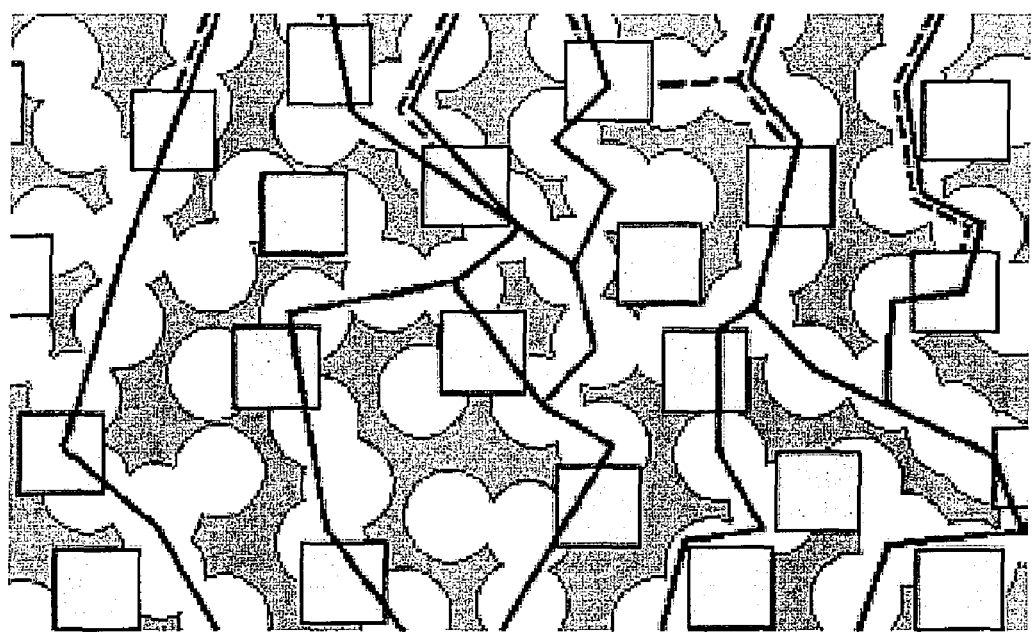

FIG. 8 shows a TIPS separation schematic for permeation of two species from the top to the bottom of the membrane shown. The dashed lines represent the path of the larger component. The solid lines represent the path of the smaller component.

Figure 9:
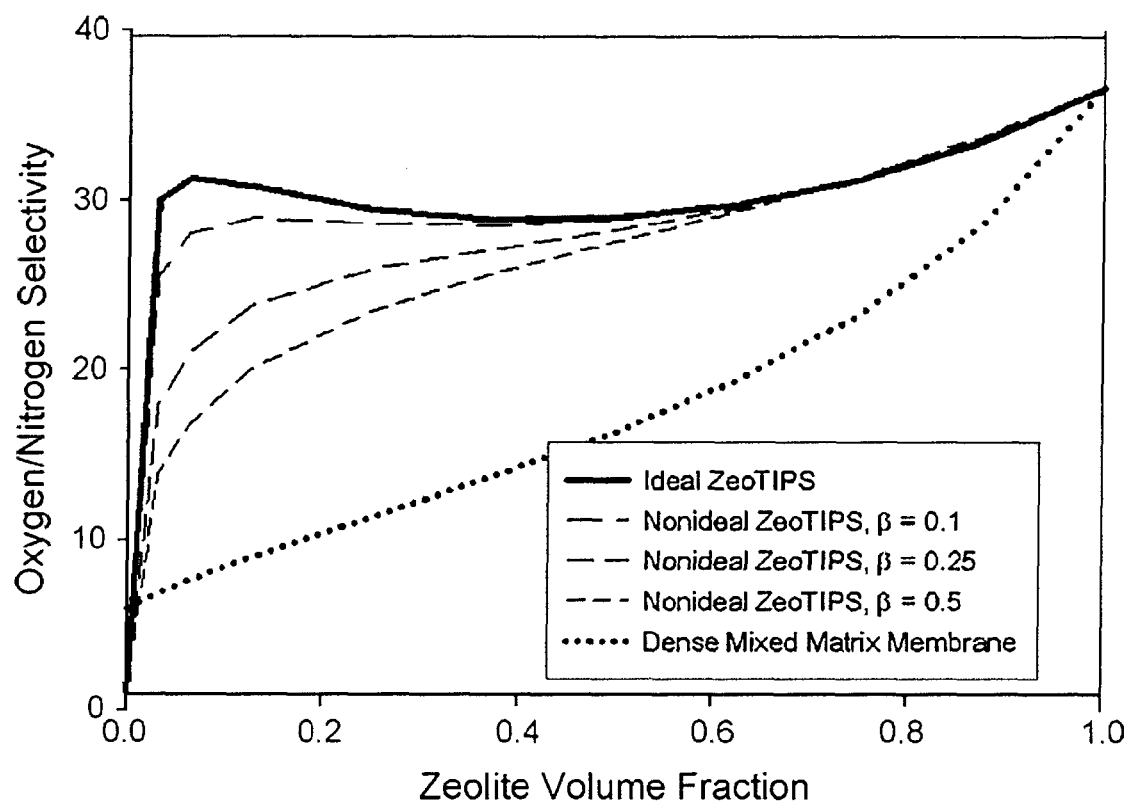

FIG. 9 shows selectivity of ideal and non-ideal TIPS membranes (with 3:1 void to polymer ratios) and dense mixed matrix membranes using data stated in Table 1.

Figure 10:
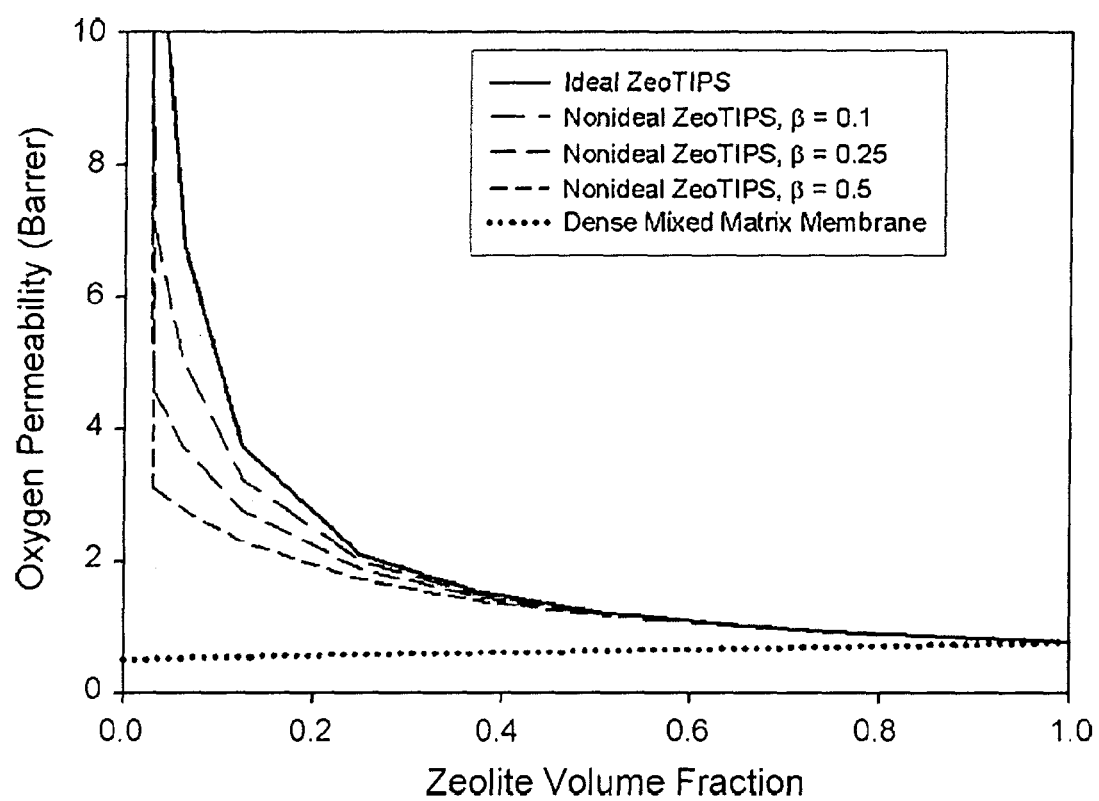

FIG. 10 shows permeability of ideal and non-ideal TIPS membranes (with 3:1 void to polymer ratios) and dense mixed matrix membranes using data stated in Table 1.

Figure 11:
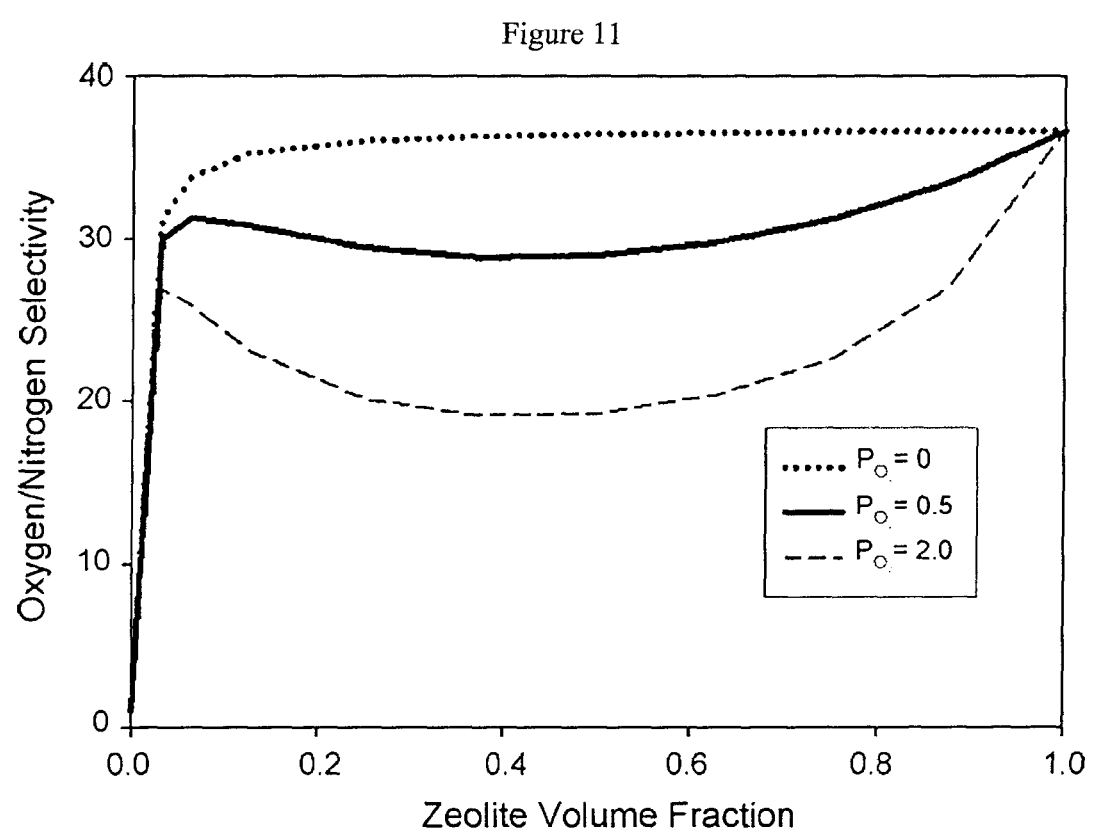

FIG. 11 shows selectivity for ideal TIPS membranes (3:1 void volume to polymer volume ratio, $P_V$=750.05×10-18 m2/s Pa (100 Barrers)), varying polymer permeability.

Figure 12:
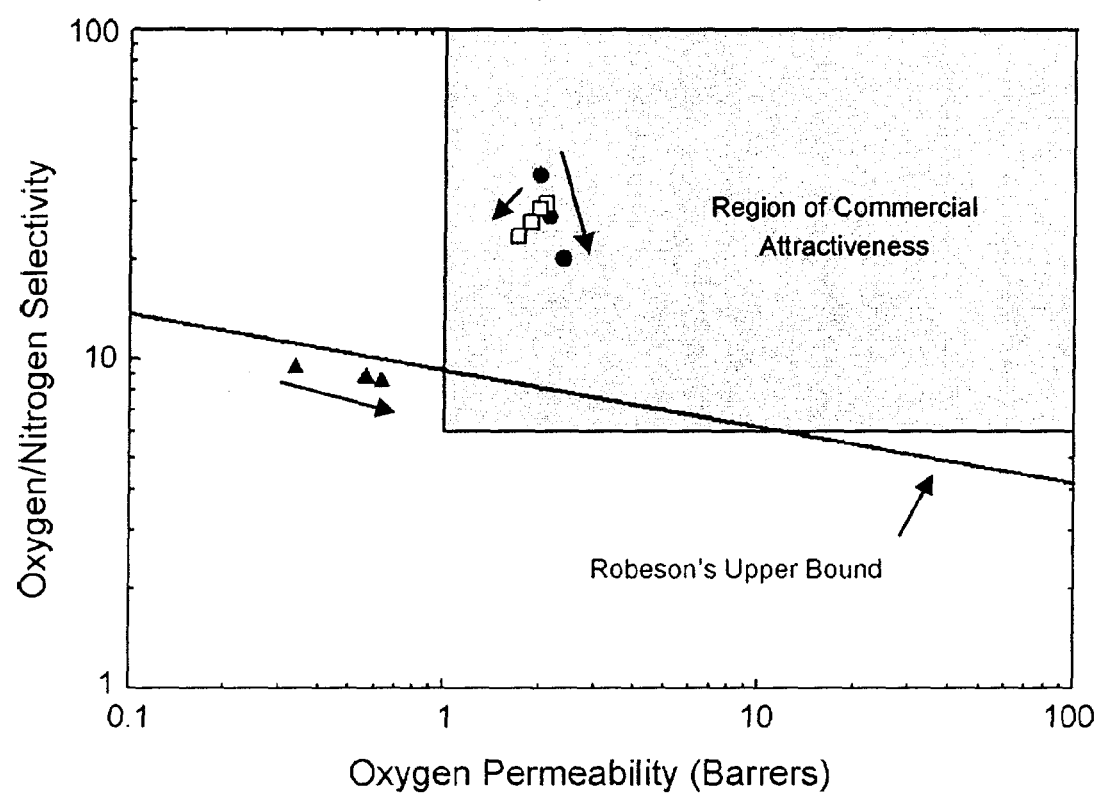

FIG. 12 shows performance of ideal TIPS membranes, with arrow indicating increasing polymer permeability (black dots), non-ideal TIPS membranes, with arrow indicating increasing β (white squares), and dense mixed matrix membranes, with arrow indicating increasing polymer permeability (black triangles), plotted with Robeson's 1991 upper bound and region of commercial attractiveness [1]. All points correspond to 25 vol % zeolite loading, and all TIPS membrane points correspond to a 3:1 void volume to polymer volume ratio.

Figure 13:
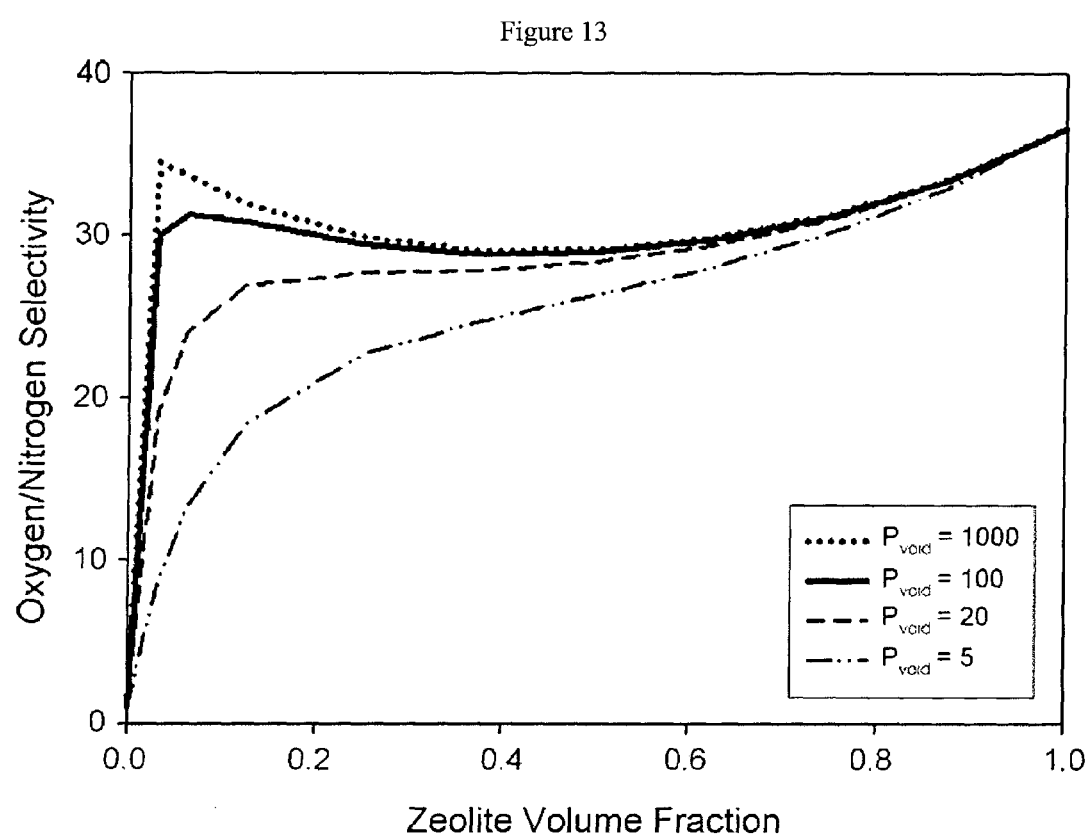

FIG. 13 shows selectivity for ideal TIPS membranes (3:1 void volume to polymer volume ratio, matrix of PVAc), varying void permeability.

Figure 14:
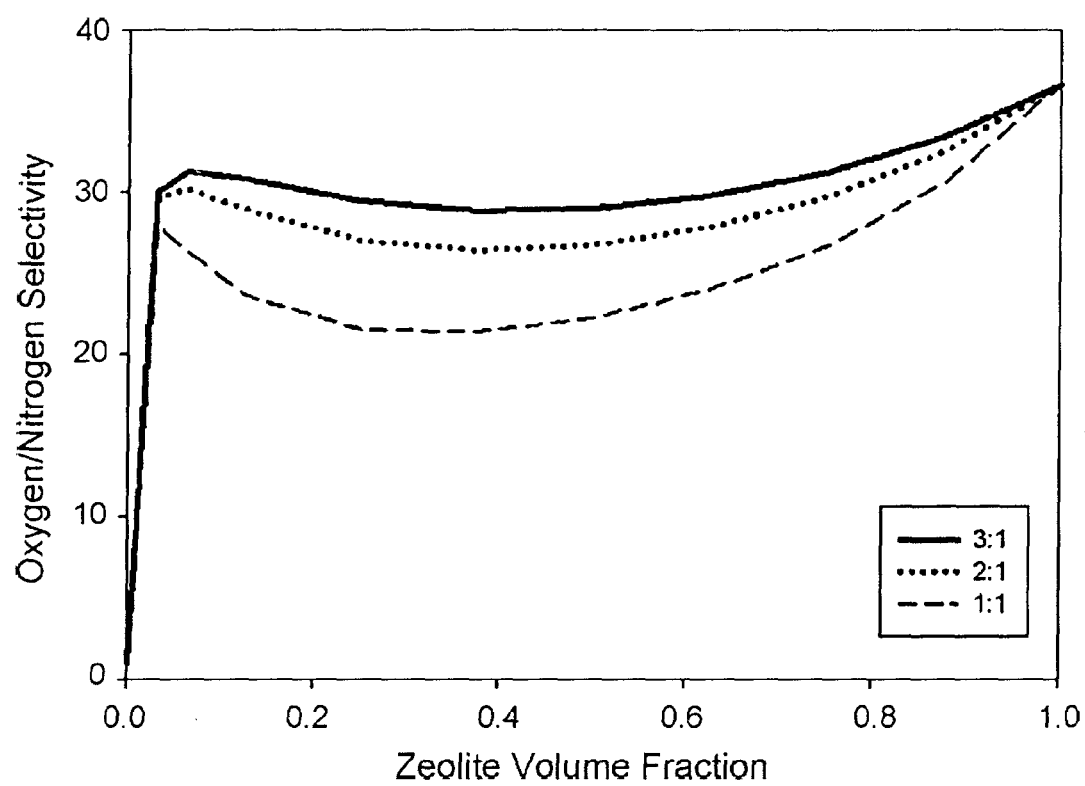

FIG. 14 shows selectivity for ideal TIPS membranes (matrix of PVAc, $P_V$=750.05×10-18 m2/s Pa (100 Barrers)), varying void volume to polymer volume ratio.

While the present disclosure is susceptible to various modifications and alternative forms, specific example embodiments have been shown in the figures and are herein described in more detail. It should be understood, however, that the description of specific example embodiments is not intended to limit the invention to the particular forms disclosed, but on the contrary, this disclosure is to cover all modifications and equivalents as illustrated, in part, by the appended claims.

DESCRIPTION

The present invention relates to microporous mixed matrix membranes for separation. More particularly, the present invention relates to high selectivity polymer-nano-porous particle membrane structures, or TIPS membranes, that are useful for, among other things, water purification (removal of salts and dissolved organics) and gas separation. Methods of fabricating such membranes are also described herein. As used herein, the term "TIPS membrane" and its derivatives refers to a membrane formed by thermally induced phase separation (TIPS membrane) further comprising at least one nano-porous particle.

In certain embodiments, the TIPS membranes of the present invention, among other things, are of narrow pore size distribution needed to achieve the desired refined separations. Such a membrane addresses the drawbacks of both zeolite film and traditional mixed matrix membranes by providing a porous matrix for nano-porous particles, allowing only the particles to participate in the separation. This unique structure will give the same separation capabilities of the continuous film zeolite membrane with greater durability and flexibility.

In general, TIPS relies on the principle that homogeneous polymer solutions or polymer blends often become thermodynamically unstable when the temperature is decreased (or in some cases increased) and consequently separate into two phases. In its simplest form, the TIPS process can be described as follows.

(1) A homogeneous solution is formed by melt-blending a polymer with a high-boiling, low molecular weight diluent, which does not dissolve the polymer at room temperature. The diluent can be a liquid or solid at room temperature.

(2) The solution is cast, extruded, or molded into the desired shape: flat sheet, hollow fibre, tube, etc.

(3) Thermal energy is removed via quenching to a desired temperature or cooling at a controlled rate. This step results in the formation of co-continuous polymer-rich and diluent-rich phases, and, eventually, the solidification of the polymer-rich phase.

(4) The diluent is removed to yield a microporous polymer structure.

Depending on a number of system properties (including thermodynamic considerations) and processing parameters (including cooling rate or quench temperature), the melt-blend may undergo one of three phase separation sequences: (i) liquid-liquid (L-L) TIPS, in which the melt-blend separates into polymer-rich and polymer-lean liquid phases, followed by solidification of the polymer-rich phase, (ii) solid-liquid (S-L) TIPS, in which the polymer crystallizes from the melt-blend, and (iii) liquid-solid (L-S) TIPS, in which the diluent crystallizes from the melt-blend, followed by solidification of the polymer. The micro-structure of the resulting membrane depends on which of these three sequences occurs and the kinetics of structure development. In the present invention, any of L-L, S-L, and L-S TIPS may be used.

In certain embodiments, a L-L TIPS membrane is formed by first mixing a polymer with a high boiling point diluent at high temperatures to melt-blend the two components into a substantially homogeneous phase. The diluent acts as a solvent for the polymer only at high temperatures, and by cooling the homogeneous solution, droplets of a polymer-lean phase form in a continuous polymer-rich phase. Factors controlling the size of the diluent-rich droplets include the polymer concentration in the homogeneous solution and the cooling rate, which affects the coarsening time. Upon solidification, the diluent droplets form the cells of the final membrane. Finally, the diluent is removed (e.g., with a volatile solvent), and the membrane is dried, leaving an open microporous structure. These membranes are useful for, among other things, microfiltration, because they are flexible and inexpensive, and can be tailored to any desired pore size within a certain range simply by adjusting the cooling rate or polymer concentration. However, these membranes do not possess the narrow pore size distribution needed to achieve the desired refined separations.

Figure 1:
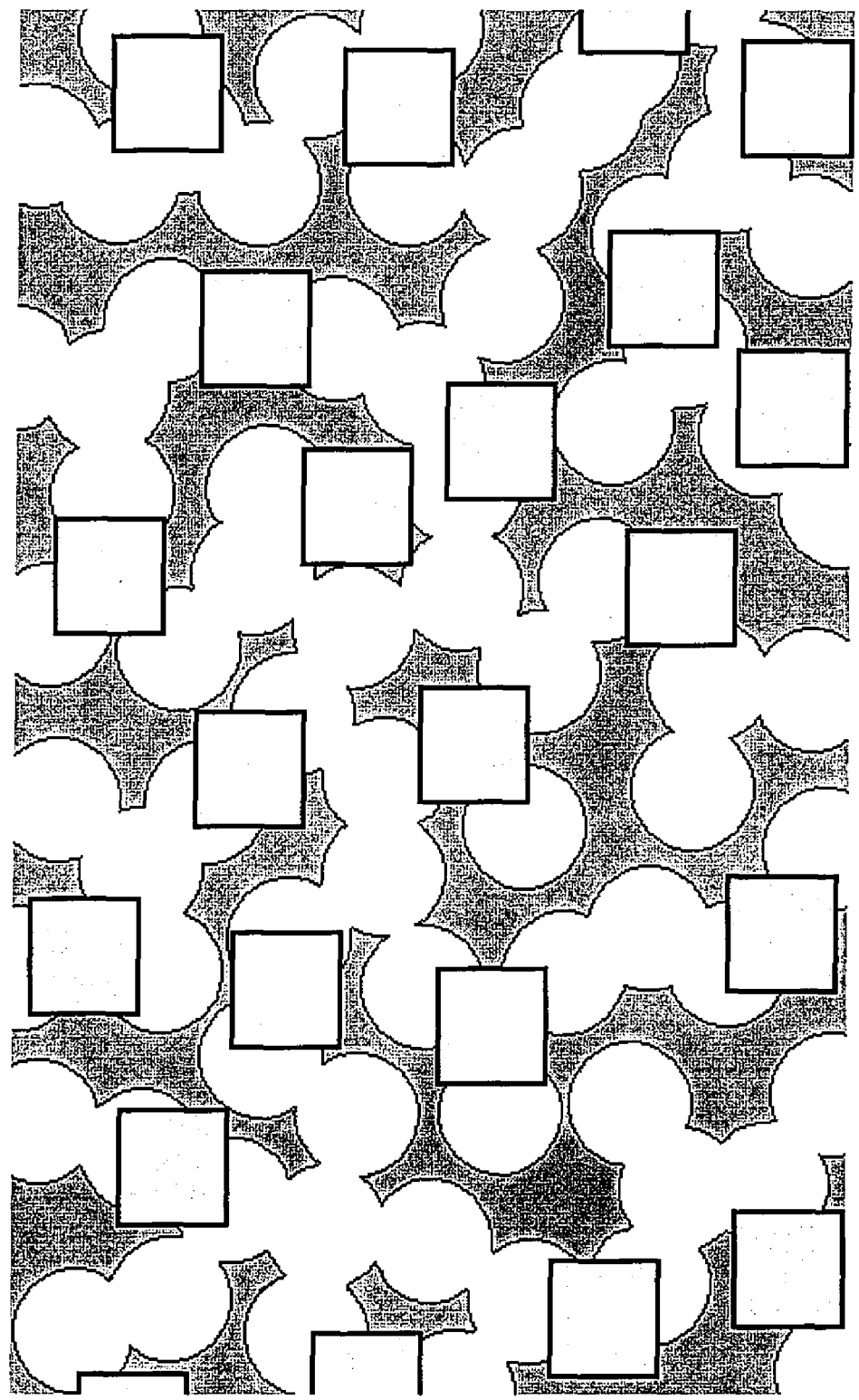
FIG. 1 shows a schematic of a TIPS membrane in which no continuous microporous path exists across the membrane.

Generally, the TIPS membranes of the present invention are formed by mixing nano-porous particles, into a homogeneous solution of polymer and diluent (polymer-diluent system) at elevated temperatures. By way of explanation, and not of limitation, upon cooling below the polymer-diluent phase separation temperature, droplets of diluent form between the suspended nano-porous particles. Cooling further solidifies the microporous polymer matrix, and removing the diluent results in the final structure. Removing of the diluent may not necessary for some applications, and the membrane may still function if some of the diluent is left inside the matrix. The matrix is formed in such a way that no microporous channel can reach completely across the membrane without blockage by at least one nano-porous particle, forcing the permeate to diffuse through the particles (FIG. 1). The TIPS membranes of the present invention may be formed in any shape suitable for an intended application, including, but not limited to, sheets, tubes, or hollow fibers, allowing high surface areas for separation, if desired.

In certain embodiments, the mechanism by which a successful TIPS membrane is formed may occur in the following steps. First, zeolite particles are suspended in a homogeneous solution. By way of explanation, and not of limitation, upon cooling, diluent droplets begin to form in the microporous polymer matrix surrounding the particles. As they grow, assuming an equal affinity of polymer and diluent for the zeolites, the droplets deform as their walls conform to the shape of the zeolite particles. When the system solidifies, the zeolites become substantially locked into place by the polymer, taking up space where micropores would reside in a traditional microporous membrane. Thus, micropores are "blocked", preventing connectivity between neighboring cells. When enough micropores are "blocked" by particles, the critical zeolite loading is reached, and no continuous microporous path can reach across the membrane.

Any suitable polymer may be used in the fabrication of the membranes. Suitable examples of polymers include, but are not limited to, polyolefins, copolymers containing polyolefins (such as polyethylene-co-vinyl alcohol, poly(ethylene-co-acrylic acid), and poly(ethylene co-vinyl acetate)), polyimides, polyamides, polystyrenes, cellulosic polymers, polysulfones, poly(vinylidene fluoride), poly(vinyl chloride), poly(methacrylates), derivatives thereof, and combinations thereof. Copolymers containing any of these may be useful in the compositions and methods of the present invention.

The choice of diluent used in the fabrication of the membranes may depend upon, among other things, the solubility of the diluent relative to that of the polymer. In certain embodiments, the diluent may be any high-boiling point chemicals and may or may not be liquid at room temperature. Suitable examples of diluent include, but are not limited to, diphenyl ether, 1,4-butanediol, polyethylene glycol, and dodecanol.

In certain embodiments, the polymer-diluent systems used in the fabrication process may be a main factor in determining the cell size in the membrane as a result of the interactions between the polymer and diluent at high temperatures. The nature of these interactions may change significantly from system to system. Major changes in processing conditions may be needed if the phase separation behavior of a system does not meet specific needs. For example, if the cells are not large enough, the cooling rate may need to be slowed to allow the cells to grow larger. This increases processing time and may require more processing equipment. The polymer-diluent system also determines whether or not the nano-porous particles will interact well with the microporous matrix without surface modification. The polymer-diluent systems used in the fabrication process may include diphenyl ether as a diluent for isotactic polypropylene (iPP), low density polyethylene (LDPE), high density polyethylene (HDPE), poly(ethylene co-acrylic acid) (EAA) and poly(ethylene co-vinyl acetate) (EVA), systems of poly(methyl methacrylate) (PMMA) with cyclohexanol, 1,4-butanediol and poly(ethylene glycol) (PEG) as diluents, systems of poly(ethylene co-vinyl alcohol) (EVAL) with glycerol and PEG as diluents, polystyrene-dodecanol, and any other system with readily available phase diagrams and physical data and a wide range of functional groups and crystallinities. Examples of suitable solvents may be found in Table 1.

TABLE 1

Examples of TIPS polymer-diluent systems

| Polymer | Abbrev. | Diluent | Type |
|---|---|---|---|
| Acrylonitrile-butadiene-styrene rubber | ABS | Diphenylamine | L-L |
| Carboxymethycellulose (ammonium salt) | CMC | Water | L-L |
| Cellulose acetate | CA | 2-Ethyl-1,3-hexanediol | L-L |
| | | 2-Methyl-2,4-pentanediol | L-L |
| Dextran | | Water | L-L |
| Nylon 11 | | Ethylene carbonate | L-L |
| | | 1,2-Propylene carbonate | L-L |
| | | Tetramethylene sulfone | L-L |
| Nylon 12 | | Polyethylene glycol | L-L |
| Polyacrylonitrile | PAN | Maleic anhydride | L-L |
| | | Methyl sulfone | L-S |
| Poly(ε-caprolactam) | PCL | Dioxane/water | L-L |
| Polycarbonate (Lexan) | PC | Menthol | L-L |
| Polychlorotrifluoroetheylene | (Kel-F) | KF-3 oligomer oil | S-L |
| Poly(2,6-dimethyl-1,4-phenylene ether) | PPE | Caprolactam | L-L |
| | | Cyclohexanol | L-L |
| | | Decalin | S-L |
| | | N,N-bis(2-hydroxyethyl) tallowamine | L-L |
| Poly(ether ether ketone) | PEEK | Polyetherimide (PEI) | S-L |
| Polyetherimide (Ultem) | PEI | Benzoic Acid | L-S |
| Polyethersulfone | PES | Benzoic Acid | L-S |
| | | Bisphenol-A | L-L |
| | | Cyclohexanol | L-L |
| | | Phenyl benzoate | L-L |
| | | Resoricinol | L-L |

TABLE 1-continued

Examples of TIPS polymer-diluent systems

| Polymer | Abbrev. | Diluent | Type |
|---|---|---|---|
| Polyethylene, Low density | LDPE | Decalin | L-L |
| | | Dibenzyl ether | L-L |
| | | Diisodecyl phthalate | L-L |
| | | Diphenyl ether | L-L |
| | | 1-Dodecanol | L-L/S-L |
| | | 1-Hexadecanol | L-L/S-L |
| | | Mineral oil | L-L/S-L |
| | | N,N-bis(2-hydroxyethyl) tallowamine | L-L |
| | | 1-Octadecanol | L-L/S-L |
| | | Octadecane | L-L/S-L |
| | | Toluene | S-L |
| Polyethylene, High density | HDPE | Amyl acetate | S-L |
| | | Benzaldehyde | S-L |
| | | Benzophenone | S-L |
| | | Biphenyl | S-L |
| | | Diisodecyl phthalate | L-L |
| | | Diphenyl ether | L-L |
| | | Isoamyl acetate | S-L |
| | | Mineral oil | S-L |
| | | N,N-bis(2-hydroxyethyl) tallowamine | L-L |
| Poly (ethylene chlorotrifluoroethylene) | ECTFE | Dibutyl phthalate | L-L |
| Poly(ethylene co-acrylic acid) | EAA | Benzoic acid | L-S |
| | | Diphenyl ether | L-L |
| | | Dioctyl phthalate | L-L |
| | | Mineral oil | L-L |
| | | N-coco diethanol amine | L-L |
| | | N-tallow diethanol amine | L-L |
| | | Vegetable oils | L-L |
| Poly(ethylene co-vinyl acetate) | EVAc | Benzoic acid | L-S |
| | | Diphenyl ether | L-L |
| Poly(ethylene co-vinyl alcohol) | EVAL, EVOH | 1,3-Butanediol | S-L |
| | | Glycerol | L-L |
| | | Polyethylene glycol | L-L |
| | | 1,3-Propanediol | S-L |
| Poly(ethyl methacrylate) | PEMA | 1-Butanol | L-L |
| Poly(L-lactic acid) | PLLA | Dibutyl phthalate | L-L |
| | | Dihexyl phthalate | L-L |
| | | Dioxane/tetrahydrofuran | L-L |
| | | Dioxane/water | L-L |
| | | Dipentyl phthalate | L-L |
| | | Hydroxyapatite | L-L |
| | | p-Hydroxybenzoic acid | L-S |
| Poly(D,L-lactic-co-glycolic acid) | PLGA | Hydroxyapatite | L-L |
| | | Dimethylcarbonate | S-L |
| Poly(methyl methacrylate) | PMMA | Benzoic acid | L-L |
| | | 1,4-Butanediol | L-L |
| | | 1-Butanol | L-L |
| | | t-Butyl alcohol | L-L |
| | | Cyclohexanol | L-L |
| | | Dioctyl phthalate | L-L |
| | | Lauric acid | L-L |
| | | Polyethylene glycol | L-L |
| | | Sulfolane | L-L |
| Poly(4-methyl-1-pentene) | TPX | Bibenzyl(1,2-diphenylmethane) | S-L |
| | | Butylbenzoate | L-L |
| | | Decanoic acid | L-L |
| | | Dibenzyl ether | L-L |
| | | Dibutyl phthalate/dioctyl phthalate | L-L |
| | | Dihexysebacate | L-L |
| | | Diisopropylbenzene | L-L |
| | | 1-Dodecanol | L-L |
| | | Dodecylamine | L-L |
| | | 1-Hexadecene | L-L |
| | | Mineral oil | S-L |
| | | Naphthalene | L-L |
| | | 2-Undecanol | L-L |
| | | 6-Undecanol | L-L |
| Poly(oxymethylene) | POM | Diphenyl ether | S-L |
| Poly(phenylene sulfide) | PPS | 4-Benzoylbiphenyl | S-L |
| | | Diphenyl ketone | L-L |
| | | Diphenyl sulfone | L-L |

TABLE 1-continued

Examples of TIPS polymer-diluent systems

| Polymer | Abbrev. | Diluent | Type |
|---|---|---|---|
| Poly(phenylene sulfide)- | | Diphenyl amine | L-L |
| Polystyrene (Noryl) | | Dibutyl phthalate | L-L |
| | | Hexabromophenol | L-L |
| Polypropylene | PP, iPP, aPP | Aliphatic alcohols | L-L, S-L |
| | | Alkyl phenols | L-L, S-L |
| | | Aryl phenols | L-L |
| | | Di-2-ethylehexylphthalate | L-L |
| | | Diphenyl ether | L-L |
| | | Diphenylmethane | L-L |
| | | Dotriacontane | S-L |
| | | Eicosane | S-L |
| | | Eicosanic acid | S-L |
| | | Hexamethylbenzene | L-S |
| | | Methyl salicylate | L-L |
| | | Mineral Oil | S-L |
| | | N,N-bis(2-hydroxyethyl) tallowamine | L-L |
| | | Pentadecanoic acid | S-L |
| | | Quinoline | L-L |
| | | Tetradecane | S-L |
| Polystyrene | PS | Benzene | L-S |
| | | Cyclohexane | L-L |
| | | Cyclohexanol | L-L |
| | | trans-Decalin | L-L |
| | | Diethyl malonate | L-L |
| | | Diiosdecyl phthalate | L-L |
| | | Dioxane | L-S |
| | | Dioxane/n-hexane | L-L |
| | | Dioxane/isopropanol | L-L |
| | | 1-Dodecanol | L-L |
| | | Nitrobenzene | L-L, L-S |
| Poly(tetrafluoroethylene-co-perfluoro-(propyl vinyl ether)) | Teflon PFA | Chlorotrifluoroethylene | L-L/S-L |
| Polyurethaneurea | PUU | Dimethylsulfoxide | L-S |
| Poly(vinyl butyral) | PVB | Polyethylene glycol | L-L |
| Polyvinylchloride | PVC | 1-Phenylethanol | L-L |
| | | trans-Stilbene | L-L |
| | | Tetrabromo phthalic ester | L-L |
| Poly(vinylidene fluoride) | PVDF | Benzophenone | L-L |
| | | Butyrolacetone | S-L |
| | | Carbitol acetate | S-L |
| | | Cycloxanone | S-L |
| | | Dibutyl phthalate | S-L |
| | | Dimethyl phthalate | L-L |
| | | Propylene carbonate | S-L |
| | | Sulfolane | S-L |
| Styrene-butadiene rubber | SBR | Decyl alcohol | L-L |
| | | Diphenyl amine | L-L |
| | | N-coco diethanol amine | L-L |
| | | N-tallow diethanol amine | L-L |

Figure 2:
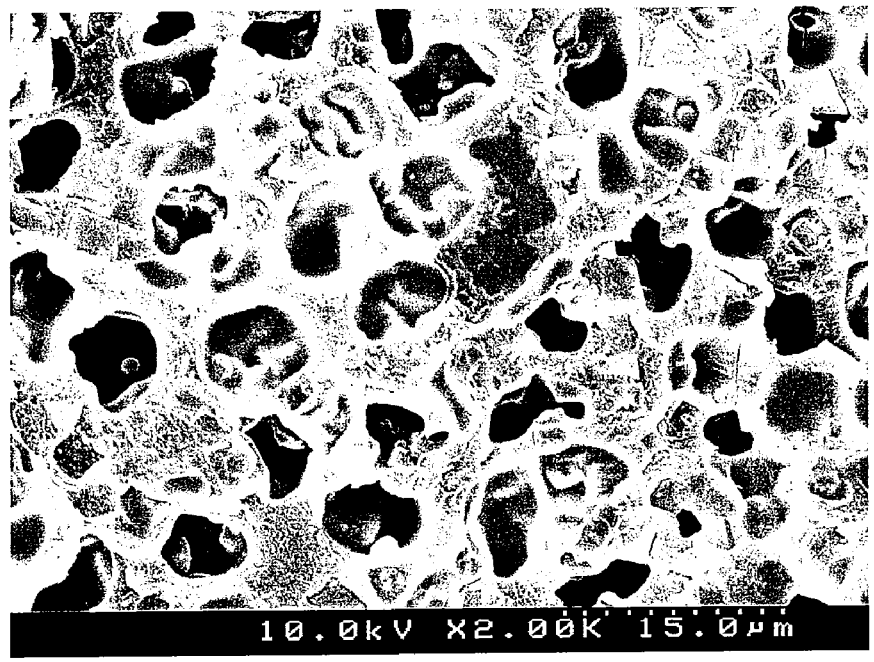
FIG. 2 shows an SEM image of a TIPS membrane formed from poly(methyl methacrylate), 1,4-butanediol, and Type 4A molecular sieve particles modified with the addition of ethyl groups to their surfaces.
Figure 3:
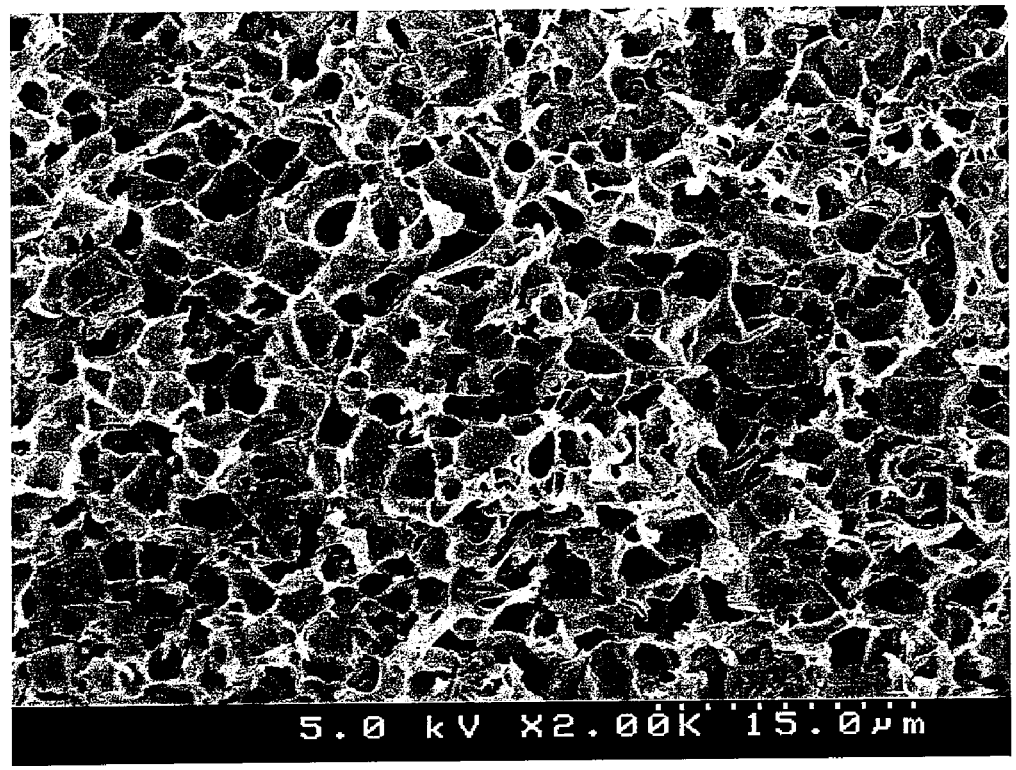
FIG. 3 shows an SEM image of a TIPS membrane formed from isotactic polypropylene, diphenyl ether, and Type 4A molecular sieve particles.

In certain embodiments, the nano-porous particles used in the membranes of the present invention may be made from zeolites comprising oxides of elements such as Si, Fe, Ge, P, and Al. In certain embodiments, the zeolite may be Type 4A molecular sieve, which is widely available and inexpensive (FIGS. 2 and 3). In certain embodiments, the zeolite may be Type 3A molecular sieve. In certain embodiments, the zeolite may be Type 5A molecular sieve. In certain embodiments, the zeolite may be Type X molecular sieve. The zeolite may be synthetic or natural. In certain embodiments, metal-organic frameworks and organic molecular sieves may be useful in the compositions and methods of the present invention. In certain embodiments, the nano-porous particles may range in size from about 0.5 to about 15 μm with a pore size ranging from about 0.1 to about 10,000 nm.

A wide range of functional groups may be attached to zeolite surfaces. Generally, functional groups that may be attached are organic functional groups that may react with the surface alcohols of the zeolite, with or without a catalyst. Often a condensation reaction will occur between the alcohol groups on the zeolite surface and the functional group to be added. Short alkyl groups may be added to the surface (FIG. 2), following the acid-catalyzed reaction below.

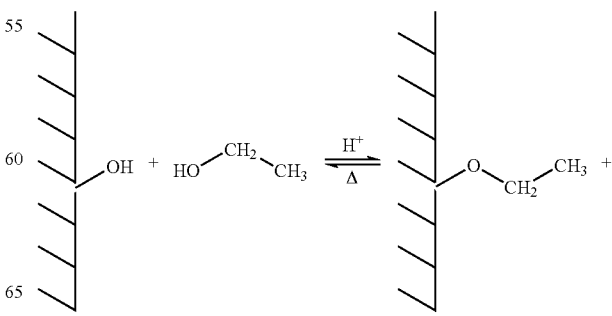

Ester groups also may be added by the following reaction with acetic acid when heated.

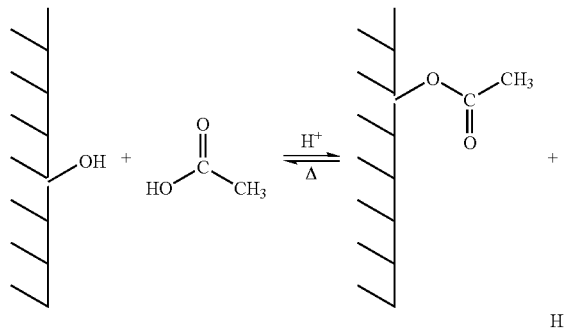

Other groups, such as phenyl groups, may be added by similar reactions, all performed by refluxing zeolite powder suspended in the chemical component to be added.

Once made, the TIPS membrane may be formed into a desired shape methods known in the art. For example, the TIPS membrane may be formed using a hot mold of the desired shape and dimensions and subsequently cooling the mold in a controlled fashion. In other examples, a continuous method to produce the TIPS membranes may be used, such as by extruding flat sheets onto a metal chill roll or into a water bath or by extruding tubes and hollow fibres into a quench bath.

To facilitate a better understanding of the present invention, the following examples of specific embodiments are given. In no way should the following examples be read to limit or define the entire scope of the invention.

EXAMPLES

Example 1

The feasibility of a particular polymer-diluent system was tested by forming membranes using the following steps. First, a desired quantity of polymer pellets and diluent is added to a sealed test tube and heated above the melting point of the polymer for ~48 hours, agitating periodically to ensure homogeneity. Once the solution is homogeneous it is solidified using liquid nitrogen and brought back to room temperature. A portion of this solid sample is weighed and added to a new test tube along with the proper amount of zeolite powder. Before sealing the test tube, a small magnetic stirrer is added. This sample is heated above the polymer melting point again for ~2 hours. Every few minutes, a rare earth magnet is used to agitate the suspension. This must be done since, due to the high viscosity of the suspension, other agitation methods are ineffective. Once well agitated, the suspension is solidified in liquid nitrogen and brought back to room temperature. A slice of the solid sample is then heated to a desired temperature on a hot stage and cooled at a controlled rate. To mimic the cooling rates of extruded films, the highest possible cooling rate allowed by the hot stage of 125° C./min is used. The membranes are extracted using an appropriate solvent for 24 hours to remove the diluent. Scanning electron microscope (SEM) analysis reveal whether or not the polymer has a favorable interaction with the zeolite particles.

If a system is found to be feasible by the hot stage technique, further membranes may be formed using a Leistritz twin-screw extruder. Conditions to be controlled in the extrusion process are mostly related to cooling rate. Films are formed using air cooling on a heated fiberglass screen belt. The temperature of the belt is the most important factor in controlling the cooling rate of the membrane. Furthermore, the thickness of the films is varied to determine the thinnest film that can be made while still cooling slow enough to promote good polymer-zeolite adhesion. Film thickness is varied by changing the width of the die slit, by increasing or decreasing the suspension flow rate, or by adjusting the speed of takeup. SEM analysis is used to determine if the cooling method chosen is effective.

Example 2

The membranes formed by extrusion may be tested in dead-end pressure cells with pure water. These tests are used to experimentally determine the critical zeolite loading point. Under pressures of 300 psig, membranes that yield no immediate significant flow are assumed to be above the critical point, and a range of zeolite loadings from approximately 20-35% may be tested to find the exact critical point for comparison with the model predictions described above.

Membranes that are found to be above the critical point may be tested for desalination capabilities through reverse osmosis. Solutions of 0.1M NaCl and 0.1M KCl may be used in stirred dead-end pressure cells at 300 psig.

The same membranes may be tested for gas separation capabilities. Using low-pressure permeation cells, the permeabilities of oxygen and nitrogen in the membranes may be measured at 30 psig.

Example 3

The following three experiments may be used to characterize the effects of particle loading. The first experiment consists of 32 membranes. A design of experiments is produced using JMP software. This design is a central composite design with duplicates, capable of handling non-linear effects. Three factors are introduced: cooling rate (50° C./min, 88° C./min, 125° C./min), polymer wt-% (20%, 27.5%, 35%), and zeolite particle loading (20%, 27.5%, and 35%). These three ranges have been determined previously through experiments as the reasonable range for TIPS membranes. The polymer wt-% is calculated by taking into account only the polymer and diluent. The zeolite particle loading calculation takes into account every component of the suspension. All membranes in this experimental set are made using iPP and DPE.

The second and third experiments investigate the changes in cell size induced by a change in polymer-diluent-zeolite interaction. The systems chosen for these sets, PMMA-cyclohexanol and PMMA-1,4-butanediol, are formed into five membranes each at a cooling rate of 50° C./min, polymer wt-% of 20%, and zeolite loadings of 0, 12.5, 20, 27.5, and 35%. In addition, a fourth set of membranes are made from iPP and DPE with the same conditions as the second and third sets, consisting of two membranes made with 0% and 12.5% zeolite loading. The zeolite may have a greater affinity for the cyclohexanol and 1,4-butanediol than for PMMA, the important factor being the large difference in cell sizes between these two membranes. These are used for comparison with the iPP-DPE system, in which the zeolite has a greater affinity for the polymer than for the diluent. It is hypothesized that the difference in zeolite affinity for the polymer over the diluent affects cell growth, unless the cells are much smaller than the zeolite particles themselves. The extent of this effect will be investigated to provide insight toward predicting conditions needed to produce TIPS membranes with a desired structure.

Figure 4:
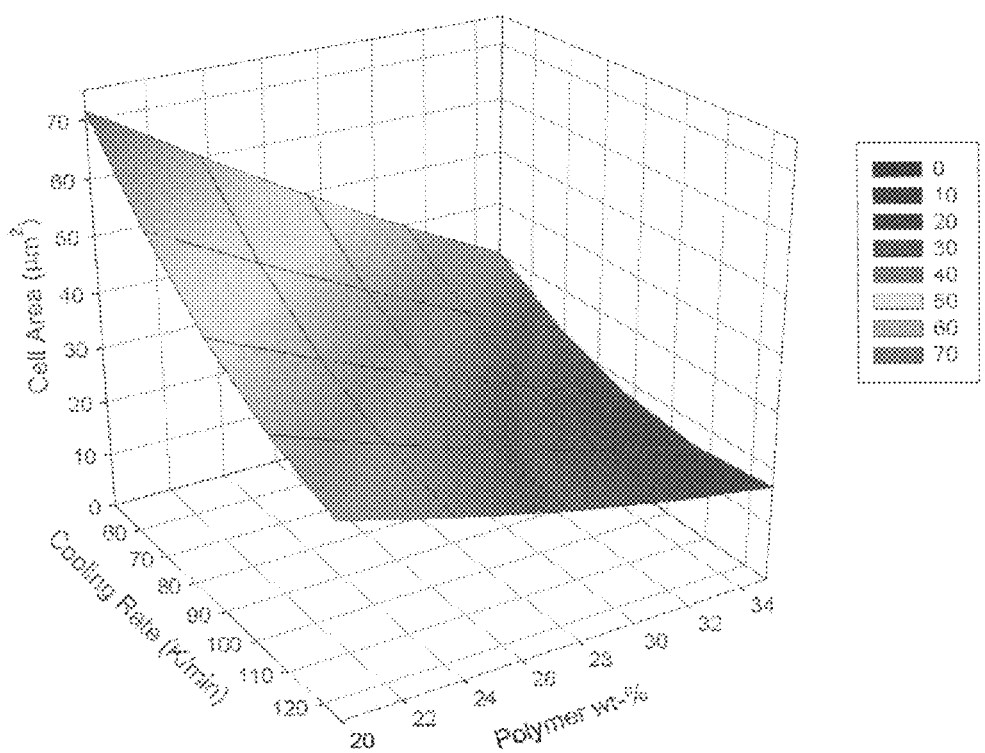
FIG. 4 shows a digital image analysis plot to determine an empirical relationship to predict cell size with suspended zeolites.

Measurements of the cell areas in each membrane may be taken using Image Pro Plus (Media Cybernetics, Inc., Silver Spring, Md.). A total of 50 cells are measured on each sample, the result from each being an average cell cross sectional area, which is used as an analogy to cell volume. The results of such a measurement are shown in FIG. 4, which shows that at constant polymer wt % and cooling rate, cell size decreases, goes through a minimum, and then increases with increasing zeolite loading.

Example 4

Figure 5:
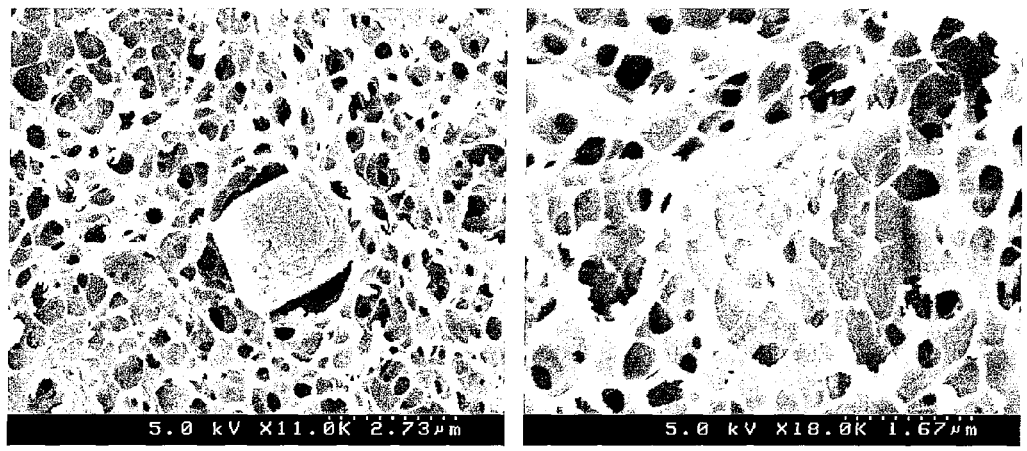
FIG. 5 show SEM images of ethyl-modified zeolite particles.
Figure 6:
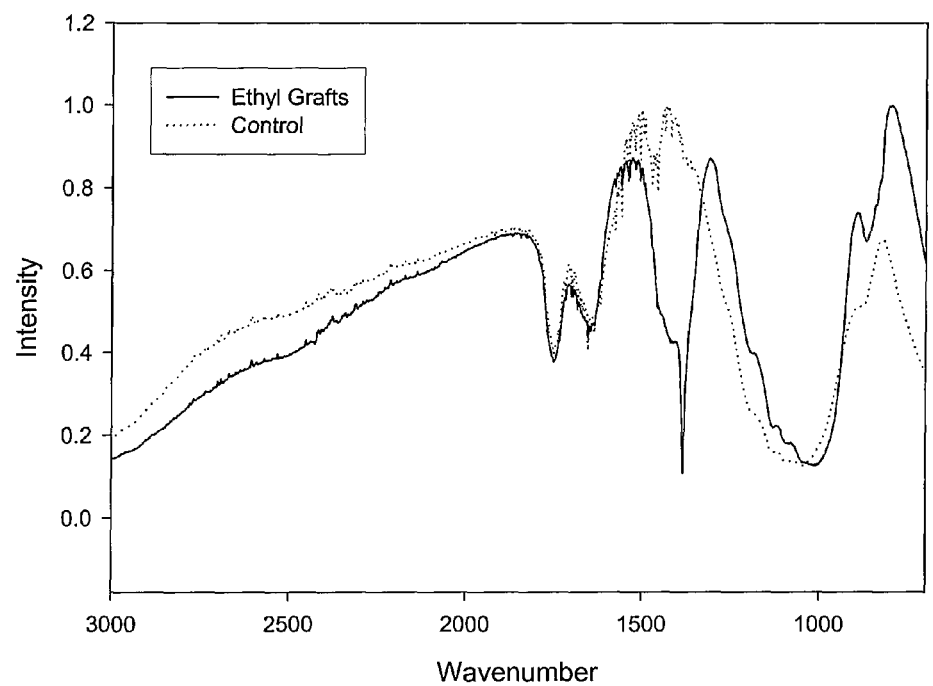
FIG. 6 shows FTIR of ethyl-modified zeolite particles.

In certain polymer-diluent systems, such as systems in which the diluent comprises an alcohol, the diluent may hydrogen bond to the zeolite surface. Thus, for some polymer systems, it may be desirable to disrupt the hydrogen bonding of such diluents, among other things, to allow use of non-hydrogen bonding polymers. In some cases, reactions may be used which graft short, non-hydrogen-bonding functional groups to the zeolite surface. Such modification may comprise, for example, ethyl or ether groups. Such reactions may be performed by refluxing the functional group and the zeolite for about 4 hours. The results of ethyl functional group grafting are shown in FIG. 5 (SEM image) and FIG. 6 (FTIR).

Example 5

Figure 7A:
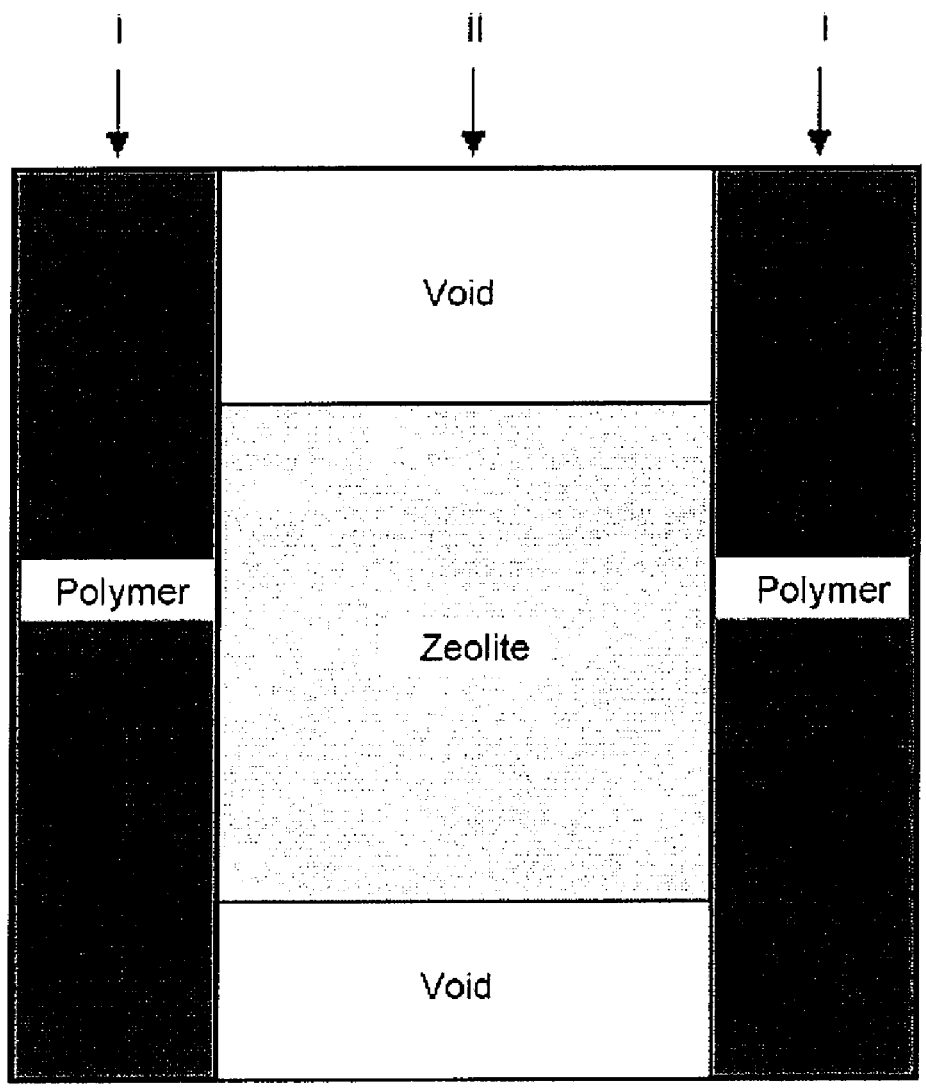
FIG. 7 shows that TIPS membranes can be modeled as (a) a polymer phase in parallel with a void and uncoated zeolite in series, or as (b) a polymer phase in parallel with void and polymer-coated zeolite in series. Membrane transport occurs from top to bottom of diagrams via path I or II.

In order to model the performance of TIPS membranes, the membrane structure is modeled in terms of a mixture polymer, voids, and zeolite particles in a parallel-series arrangement. FIG. 7 shows a schematic representation of an ideal TIPS membrane. Consider permeation from the top to the bottom of FIG. 7(a). A permeating molecule can pass through the dark grey polymer region (path I) via diffusion. An alternative or parallel path (path II) is for the molecule to pass through the void-zeolite-void sequence in series. That is, transport through the membrane can be modeled in a parallel-series fashion. Of course, producing such an ideal membrane as that shown in FIG. 7(a) is not trivial since it has been shown in the literature that the zeolite particle is often coated with a layer of polymer.

It is well documented that the formation of dense mixed matrix membranes can lead to an interphase region at the surface of the zeolite particles [2] The polymer in this interphase can be more dense or less dense than the bulk polymer. The case of a denser polymer near the zeolite surface is not a concern in the ideal TIPS membrane represented in FIG. 8, since the diffusion of permeating molecules through the polymer phase is much less than through the void and the zeolite. The case of a less dense polymer region near the zeolite surface is a result of stresses occurring during formation and is less of a concern in TIPS membranes due to the method of formation of these membranes. TIPS membranes are formed not by solvent casting, as are many dense mixed matrix membranes, but by thermally induced phase separation, and the stresses involved in diluent expulsion during polymer solidification are significantly less than those occurring when solvent evaporation is the method of membrane formation. Additionally, due to high temperatures, large stresses are unlikely to occur in the formation of TIPS membranes like those in dense mixed matrix membrane formation. Since these interphase regions are unlikely to be significant in TIPS membranes they are therefore not included in the model discussed here.

Consequently, FIG. 3(b) shows a schematic representation of a more realistic non-ideal TIPS membrane in which the zeolite particle is coated with a polymer layer of uniform thickness. The different shading for the sections of the polymer coating is used to distinguish the parallel and series paths associated with the void-zeolite-void arrangement. The model presented below is developed for non-ideal membranes (FIG. 7(b)), and it is then shown that the model can be reduced to the ideal case (FIG. 7(a)).

Parallel-series Model Construction

Figure 7B:
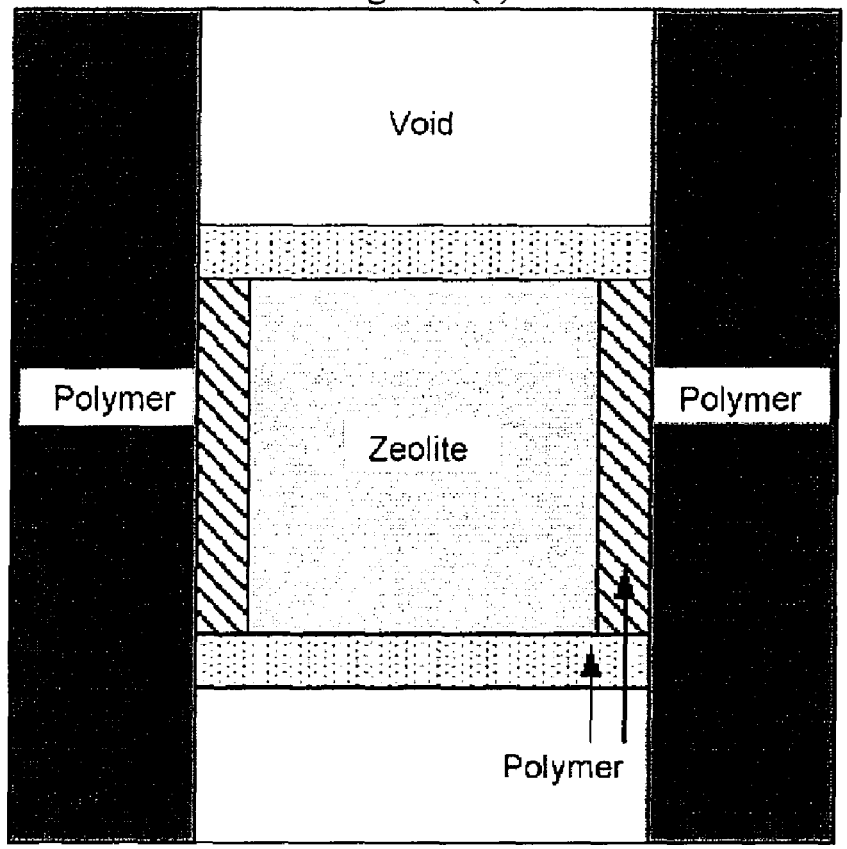

In a non-ideal TIPS membrane, as represented in FIG. 7(b), each zeolite particle has a polymer coating of uniform thickness. This coating forms when the zeolite affinity for the polymer surpasses its affinity for the diluent. As shown in FIG. 7(b), the coated zeolite itself is represented by a parallel-series arrangement, with polymer in series and in parallel with the zeolite. Thus, path II contains a region III, which represents the parallel zeolite-polymer portion of this path. In the development that follows, the variables P and φ represent permeabilities and volume fractions, respectively. The superscripts o, I, II, and III represent the overall membrane, the polymer in path I, the entirety of path II (including region III), and region III, respectively. Subscripts P, V, and Z refer to the polymer, void, and zeolite components. Permeation through path II in FIG. 7(b) is described by Eq. (1).

$$P^{II} = \frac{P_V P_P P^{III}}{(1 - \phi_V^{II} - (\phi_P^{II}/2))P_V P_P + \phi_V^{II} P_P P^{III} + (\phi_P^{II}/2)P_V P^{III}} \quad (1)$$

$P^{III}$ denotes the permeability of the parallel component of path II as represented by the zeolite and cross-hatched polymer in FIG. 3(b) and is defined as:

$$P^{III} = \phi_Z^{III} P_Z + \phi_P^{III} P_P \quad (2)$$

The variables $\phi_Z^{III}$ and $\phi_P^{III}$ as defined in Eqs. (3) and (4) denote the volume fractions of the zeolite and polymer within the path II portion of FIG. 7(b).

$$\phi_Z^{III} = \frac{\phi_Z^{II}}{\phi_Z^{II} + (\phi_P^{II}/2)} \quad (3)$$

$$\phi_P^{III} = \frac{\phi_P^{II}}{2} \quad (4)$$

The variables $\phi_Z^{II}$ and $\phi_P^{II}$ as defined in Eqs. (5) and (6) refer to the volume fractions of the zeolite and polymer (both the crosshatched and dotted polymer regions) in the entire path II portion of the membrane.

$$\phi_Z^{II} = \frac{\phi_Z^o}{\phi_Z^o + \phi_V^o + \beta\phi_P^o} \quad (5)$$

$$\phi_P^{II} = \frac{\beta\phi_P^o}{\phi_Z^o + \phi_V^o + \beta\phi_P^o} \quad (6)$$

In Eqs. (5) and (6), the factor fi refers to the fraction of the total polymer in the membrane that contributes to the coating of the zeolite particles. In Eqs. (5) and (6), $\phi^o{}_P$ and $\phi^o{}_V$ refer to overall volume fractions of the polymer and void, as defined below in Eqs. (7) and (8). $\phi^o{}_P$ and $\phi^o{}_V$ are estimated using the volume fraction of polymer and diluent in the polymer-diluent-zeolite suspension used to form the membrane. In Eq. (9), $\phi^{II}_V$ refers to the volume fraction of the void within the path II portion of the membrane as defined in Eq. (9). The volume fractions of the polymer and void ignoring the zeolite in the suspension used to make the membrane are denoted by $\phi^*_P$ and $\phi^*_V$.

$$\phi^o_P = (1 - \phi^o_Z)\phi^*_P \quad (7)$$

$$\phi^o_V = (1 - \phi^o_Z)\phi^*_V \quad (8)$$

$$\phi^{II}_V = \frac{\phi^o_V}{\phi^o_Z + \phi^o_V + \beta\phi^o_P} \quad (9)$$

The total membrane permeability is the arithmetic average of path I and path II permeabilities, as shown in Eq. (10).

$$P_{total} = \phi^I P_P + \phi^{II} P^{II} = (\phi_P^o(1-\beta))P_P + (1-(\phi_P^o(1-\beta)))P^{II} \quad (10)$$

An ideal TIPS membrane would have no polymer coating around the zeolite, resulting in an essentially co-continuous structure as shown in FIGS. 7(a) and 8. This structure can be achieved by balancing of polymer-zeolite and diluent-zeolite affinities. Such interactions can be quantitatively compared by approximating the zeolite as silica and comparing the liquid-solid interaction strength parameters of polymer-zeolite and diluent-zeolite using the Hildebrand solubility parameters of the two components [3]. To represent the ideal TIPS membrane, one sets β=0 (representing a zero thickness) in Eqs. (1) and (10). The resulting equations are (11) and (12), which describe this ideal membrane.

$$P^{II} = \frac{P_V P_Z}{\phi^{II}_Z P_V + \phi^{II}_V P_Z} \quad (11)$$

$$P_{total} = \phi^{II} P^{II} + \phi^I P_P \quad (12)$$

In Eqs. (11) and (12), the terms $P_V$, $P_P$, and $P_Z$ refer to the permeabilities of the void, polymer, and zeolite, respectively, and Ptotal refers to the average permeability of the entire membrane. The volume fractions of the membrane components are denoted by $\phi^o_V$, $\phi^o_P$, and $\phi^o_Z$. Eqs. (11) and (12) are equivalent to those in a previous analysis by Robeson et al. [4]. The results discussed below involve membranes with a constant 3:1 ratio of void to polymer; changes in zeolite loading do not affect this ratio. Membrane selectivity is defined in the standard way as the ratio of the permeabilities of the components to be separated, oxygen and nitrogen in the analysis that follows.

$$\text{selectivity} = \frac{P_{O_2}}{P_{N_2}} \quad (13)$$

Model Results

The following results are based on calculations using the polymer permeability data presented by Mahajan and Koros [1] and the zeolite 4A data calculated by Zimmerman et al. [5], which in turn was based on data taken from literature [6,7]. The permeability and selectivities used here are summarized in Table 1. The model developed here for TIPS membranes is compared below with dense mixed matrix membranes for oxygen/nitrogen separation. The polymer used for comparison is poly(vinyl acetate), and the void permeability is arbitrarily set at 750.05×10-18 m2/s Pa (100 Barrers). The effect of different Q2 void permeabilities is discussed below.

TABLE I

| Permeability data (7.5005 × $10^{-18}$ m$^2$/sPa (Barrers)) | | | |
|---|---|---|---|
| | Oxygen | Nitrogen | Oxygen/nitrogen |
| PVAc | 0.5 | 0.083 | 5.9 |
| Void | 100 | 100 | 1 |
| Zeolite | 0.77 | 0.021 | 37 |

The simulation results for the model developed above are presented in FIGS. 9 and 10 along with simulation results for dense mixed matrix membranes of the same polymer. The data for dense mixed matrix membranes is obtained by setting β=1 and $\phi^*_V$ 264=0 in the non-ideal TIPS equations and is similar to the data obtained by Mahajan and Koros using a modified Maxwell model [1]. TIPS membranes modeled in both figures contain a 3:1 void to polymer ratio. In FIGS. 9 and 10, the solid and dashed lines represent the range of useful TIPS membranes in terms of polymer-diluent-zeolite affinity. The solid line represents equal polymer-zeolite and diluent-zeolite affinity, which corresponds to the structure shown in FIG. 7(a). The dashed lines represent strong polymer-zeolite affinity and weak diluent-zeolite affinity, with varying values of β, corresponding to varying thicknesses of the polymer coating on the zeolite surfaces in FIG. 7(b). Increasing β corresponds to increasing coating thickness.

In the dense mixed matrix approximation, permeability increases slightly (dotted line in FIG. 10), and selectivity increases significantly (dotted line in FIG. 9) with increased zeolite loading. Of course, the loading cannot really approach 100%; thus, the selectivity cannot actually increase much beyond two to three times the selectivity of the matrix polymer (reported as 5.9 in Table 1). However, adding zeolite particles to the polymer matrix does indeed increase the separation efficiency of the mixed matrix membrane, as shown in FIG. 9.

Direct contact of the voids with the zeolite particles is essential to an ideal TIPS membrane, which makes the balancing of polymer-zeolite and diluent-zeolite interactions important in the formation process. In the case of strong polymer-zeolite interaction, zeolite surface modifications can be used to shift this interaction toward equal affinity of the zeolite for polymer and diluent. Several such modifications have been cited in literature [1,8].

The solid lines in FIGS. 9 and 10 represent the ideal parallel-series model shown schematically in FIG. 7(b) and thus they represent optimal membrane performance. It should be noted that the plots are not actually valid for zeolite loadings less than 20 vol %, since it has been shown experimentally in our laboratory that greater than 20 vol % zeolite is needed to prevent microporous connectivity through the membrane. The large increase in selectivity as the loading is increased from zero to ~25% results from the fact that the gas molecules can move quickly through the voids to the zeolites, and since oxygen has a higher permeability through the zeolite than through the polymer, it passes much more easily through the membrane than nitrogen, resulting in selectivities near that of the zeolite particles themselves (reported in Table 1 to be 37). Permeability drops off with increased loading, but it always remains higher than that of a dense mixed matrix membrane since the oxygen does not have to pass through the lower permeability polymer matrix.

The non-ideal parallel-series model (dashed lines in FIGS. 9 and 10) also shows significant improvement over mixed matrix membranes, due to the fact that permeating species diffuse through only a small amount of polymer when traversing the membrane. Even when half of the total polymer in the membrane contributes to coating the zeolite particles (that is, β=0.5; an unrealistic worst case scenario), the TIPS membrane still shows favorable selectivity and permeability compared to the dense mixed matrix membrane.

The goal when making membranes is to produce membranes that approach the ideal case represented by the solid lines in FIGS. 9 and 10. This can be accomplished by selecting appropriate polymer-diluent systems that have equal polymer-zeolite and diluent-zeolite affinity or by chemically modifying the zeolite surface prior to membrane formation to balance the zeolite affinity for the polymer and diluent. Consequently, the remaining discussion focuses on this ideal case.

FIG. 11 shows the increase in selectivity as the permeability of the polymer decreases to zero. The selectivity at 25 vol % zeolite loading increases from about 20 to about 36. The selectivity with a polymer permeability of zero corresponds to that of the zeolite, since the zeolite is the only selective component of the membrane. Furthermore, FIG. 11 shows that a TIPS membrane is still useful even when the matrix has a higher permeability than the zeolite filler, as is the case in FIG. 11 where $P_{O2}$=2.0. This is a result of the high permeability voids in series with the zeolite particles. This result is in contrast to dense mixed matrix membranes, which have shown less improvement over the polymer matrix when the polymer has a higher permeability than the zeolite. In such a case, the oxygen selectivity is reduced whereas the permeability is increased only slightly.

To best understand the magnitude of performance enhancement with TIPS membranes, it is useful to consider the well-documented upper bound proposed by Robeson [1]. Ideal TIPS membranes produce a separation efficiency significantly higher than the upper bound. The results in FIG. 12 pertain to membranes with permeable polymer matrices, although the point of zero permeability is included with the ideal TIPS model results. All data points involve membranes with 25 vol % zeolite loading, and as the permeability of the polymer decreases in the ideal TIPS membrane, the selectivity of the membrane increases (solid dots in FIG. 12). As the amount of polymer coating the zeolite surfaces increases in the non-ideal TIPS case (open squares in FIG. 12), the selectivity and permeability both decrease, but the values still remain well above the upper bound. Dense mixed matrix membranes with a 25 vol % zeolite loading (solid triangles in FIG. 12) remain below the upper bound for all values of polymer permeability investigated (PO2=0 point not included for DMMM).

In performing the simulations above, the permeability of the voids was arbitrarily set to 100. FIG. 13 demonstrates the sensitivity of the model to the void permeability and shows that the selectivity decreases with decreasing void permeability. Even if the void permeability is unreasonably low, the selectivity is still significantly greater than that of dense mixed matrix membranes as long as the permeability is higher than that of the polymer matrix.

FIG. 14 shows the effect of void volume to polymer volume ratio in a TIPS membrane. The greater the void/polymer ratio, the greater the selectivity due to the increased microscopic porosity of the membrane. However, ratios greater than 3:1 can lead to viscosities that are too low for extrusion and polymer concentrations that are too low for structural integrity in the solidified membrane.

Conclusions

Permeation modeling of TIPS membranes shows potential for improvement over dense mixed matrix membrane performance when the TIPS membrane is modeled as polymer in parallel with zeolite and void in series. The membrane performance is predicted to surpass Robeson's upper bound for gas separation polymers. The greatest improvement is exhibited when the polymer in an ideal TIPS membrane is impermeable to the species to be separated, in contrast to a mixed matrix membrane, which requires permeability of the polymer. An ideal TIPS membrane is predicted to improve on mixed matrix membrane performance even when the polymer has a higher permeability than the zeolite itself. Furthermore, when the permeability of the void is maximized, and when the ratio of void volume to polymer volume is the greatest that still leaves each microporous path blocked by at least one zeolite particle, the membrane efficiency is maximized. Finally, even when the TIPS membrane structure is non-ideal, as is the case when polymer coats the zeolite particles, there is a significant increase in selectivity and permeability compared to dense mixed matrix membranes.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Therefore, the present invention is well adapted to attain the ends and advantages mentioned as well as those that are inherent therein. While numerous changes may be made by those skilled in the art, such changes are encompassed within the spirit of this invention as illustrated, in part, by the appended claims.

References

1. R. Mahajan, W. J. Koros, Factors controlling successful formation of mixed-matrix gas separation materials, Ind. Eng. Chem. Res. 39 (2000) 2692-2696.
2. T. T. Moore, W. J. Koros, Non-ideal effects in organic-inorganic materials for gas separation membranes, J. Mol. Struct. (2005) 87-96.
3. A. F. M. Barton, CRC Handbook of Solubility Parameters and other Cohesion Parameters, CRC Press, Boca Raton, Fla., 1983.
4. L. M. Robeson, A. Noshay, M. Matzner, C. N. Merriam, Physical property characteristics of pulysulfone/poly(dimethylsiloxane) block copolymers, Angew. Makromol. Chem. 29 (1973) 47-62.
5. C. M. Zimmerman, A. Singh, W. J. Koros, Tailoring mixed matrix composite membranes for gas separations, J. Membr. Sci. 137 (1997) 145-154.
6. D. M. Ruthven, R. I. Derrah, Diffusion of monatomic and diatomic gases in 4A and 5A zeolites, J. Chem. Soc. Faraday Trans. 71 (1975) 2031.
7. J. Karger, D. M. Ruthven, Diffusion in Zeolites and other Microporous Solids, Wiley-Interscience Publications, New York, 1992.
8. S. Husain, W. J. Koros, Mixed matrix hollow fiber membranes made with modified HSSZ-13 zeolite in polyetherimide polymer matrix for gas separation, J. Membr. Sci. 288 (2007) 195-207.

What is claimed is:

1. A membrane comprising: at least one nano-porous particle; a microporous polymer matrix; and at least one microporous path in the microporous polymer matrix reaching across the membrane, wherein the microporous path is blocked by the nano-porous particle.

2. The membrane of claim 1, wherein the at least one nano-porous particle is selected from the group consisting of a natural zeolite; a synthetic zeolite; a metal-organic framework; an organic molecular sieve; an ion exchange resin; a chromatography packing material; and any combination thereof.

3. The membrane of claim 2, wherein the polymer matrix comprises at least one polymer selected from the group consisting of polyolefins, copolymers containing polyolefins, polyimides, polyamides, polystyrenes, cellulosic polymers, polysulfones, poly(vinylidene fluoride), poly(vinyl chloride), poly(methacrylates), and copolymers thereof.

* * * * *